(12) United States Patent
Gan et al.

US007033707B2

(10) Patent No.: US 7,033,707 B2
(45) Date of Patent: Apr. 25, 2006

(54) ORGANIC CYCLIC CARBONATE ADDITIVES FOR NONAQUEOUS ELECTROLYTE IN ALKALI METAL ELECTROCHEMICAL CELLS

(75) Inventors: Hong Gan, East Amherst, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 557 days.

(21) Appl. No.: 10/368,658

(22) Filed: Feb. 19, 2003

(65) Prior Publication Data

US 2003/0162098 A1 Aug. 28, 2003

Related U.S. Application Data

(60) Provisional application No. 60/358,199, filed on Feb. 20, 2002.

(51) Int. Cl.
*H01M 10/40* (2006.01)
(52) U.S. Cl. ........................ 429/330; 429/331; 429/333
(58) Field of Classification Search ...................... None
See application file for complete search history.

(56) References Cited

U.S. PATENT DOCUMENTS

| | | | |
|---|---|---|---|
| 5,112,704 A | 5/1992 | Furukawa et al. | |
| 5,571,637 A | 11/1996 | Idota | |
| 5,633,099 A | 5/1997 | Yokoyama et al. | |
| 5,707,756 A | 1/1998 | Inoue et al. | |
| 5,753,389 A | 5/1998 | Gan et al. | |
| 5,847,188 A | 12/1998 | Yokoyama et al. | |
| 5,986,879 A | 11/1999 | Ein-Eli et al. | |
| 5,989,743 A | 11/1999 | Yamashita | |
| 6,010,806 A | 1/2000 | Yokoyama et al. | |
| 6,017,656 A | 1/2000 | Crespi et al. | |
| 6,020,087 A | 2/2000 | Gao | |
| 6,103,420 A | 8/2000 | Nakane et al. | |
| 6,221,534 B1 * | 4/2001 | Takeuchi et al. ............ 429/347 |

FOREIGN PATENT DOCUMENTS

| | | | |
|---|---|---|---|
| JP | 61-163567 | | 7/1986 |
| JP | 61163567 | | 7/1986 |
| JP | 7-50173 | | 2/1995 |
| JP | 07-050173 | * | 2/1995 |
| JP | 07050173 | | 2/1995 |

* cited by examiner

*Primary Examiner*—Michael Barr
*Assistant Examiner*—Karie O'Neill
(74) *Attorney, Agent, or Firm*—Michael F. Scalise

(57) ABSTRACT

A lithium electrochemical cell of either a primary or a secondary chemistry activated with an electrolyte having a cyclic carbonate of a ring size equal to or larger than a six-member ring is described. The cyclic carbonate helps to make the anode passivation film ionically conductive to thereby eliminate voltage delay during pulse discharge and to reduce Rdc. Such a cell is particularly well suited for powering an implantable medical device, such as a cardiac defibrillator.

17 Claims, No Drawings

ORGANIC CYCLIC CARBONATE ADDITIVES FOR NONAQUEOUS ELECTROLYTE IN ALKALI METAL ELECTROCHEMICAL CELLS

CROSS REFERENCE TO RELATED APPLICATION

The present invention claims priority from provisional application Serial No. 60/358,199, filed Feb. 20, 2002.

BACKGROUND OF THE INVENTION

1. Field of Invention

This invention relates to an electrochemical cell having a nonaqueous electrolyte and, particularly, to lithium cells of both primary and secondary chemistries. The activating electrolyte is provided with an organic cyclic carbonate additive.

2. Prior Art

As is well known by those skilled in the art, an implantable cardiac defibrillator is a device that requires a power source for a generally medium rate, constant resistance load component provided by circuits performing such functions as, for example, the heart sensing and pacing functions. From time to time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected.

Lower pulse voltages from the electrochemical cell power source to the capacitor caused by voltage delay, even if only temporary, are undesirable since they can cause circuit failure in cardiac defibrillator applications. They can also effectively result in shorter cell life. Internal cell impedance (Rdc) build-up also reduces cell life by lowering the pulse voltage during high rate discharge. Accordingly, reduction and even elimination of voltage delay and Rdc during pulse discharge is important for proper cardiac defibrillation operation and extended device life.

In that light, it is well known that the anode surface film, known as solid-electrolyte interface (SEI), plays a very important role in the discharge performance of either a primary or a secondary alkali metal electrochemical cell, and in particular, a lithium cell. The formation of a surface film is unavoidable for alkali metal, and in particular, lithium metal anodes, and for lithium intercalated carbon anodes, due to their low potential and high reactivity towards organic electrolytes. The present invention is directed to modification of the chemical composition and morphology of the anode surface film to make it electrically insulating and ionically conducting.

U.S. Pat. No. 5,753,389 to Gan et al. describes several classes of organic carbonate additives that are useful in the electrolyte of lithium electrochemical cells for the purpose of modifying the SEI to improve its ionic conductivity. Among them are linear carbonates, such as dibenzyl carbonate and diallyl carbonate.

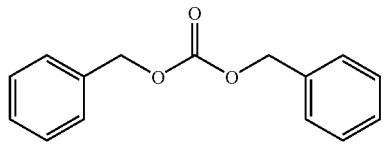

Dibenzyl Carbonate

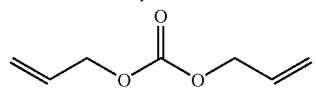

Diallyl Carbonate

Cyclic carbonates having a five-member ring, such as 4-phenyl-1,3-dioxolan-2-one are also described in the Gan et al. patent.

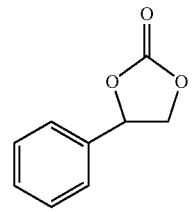

4-Phenyl-1,3-Dioxolan-2-One

The primary reason the additives of the Gan et al. patent have a beneficial effect on cell performance is that they are reductively cleaved to produce $Li_2CO_3$. This compound forms on the anode surface as a protective film, which slows down or prevents further decomposition of electrolyte at the anode surface.

In order to achieve the desired effect, the carbonate additives have to reductively compete with the electrolyte components to form $Li_2CO_3$ on the anode surface. One of the key requirements is that at least one of the C—O bonds in the carbonate [C—OC(=O)O—C] functional group is weaker than the functional groups in the electrolyte components, or that the reduction product is relatively more stable than the reduction product of the electrolyte components.

Subsequently, Crespi et al. in U.S. Pat. No. 6,017,656 described a class of cyclic carbonates that are useful in nonaqueous electrolytes for providing an ionically conductive passivation film on the anode surface. The cyclic carbonates included 4,5-diphenyl-1,3-dioxolan-2-one, among others having a five-member ring base (or being of an ethylene carbonate ring).

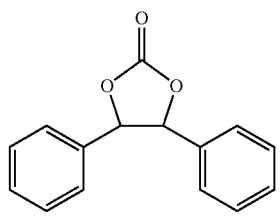

4,5-Diphenyl-1,3-Dioxolan-2-One

However, in both the above-discussed Gan et al. and Crespi et al. patents, no cyclic carbonates larger than those having a five-member ring base are described.

SUMMARY OF THE INVENTION

Since the effectiveness of any carbonate additive in improving lithium cell performance depends on the effectiveness with which the anode SEI film containing $Li_2CO_3$ forms, it is important that the carbonate additive effectively compete with the other electrolyte components (solvents and salts) to form the desired beneficial anode surface passivation layer. The faster the carbonate additive reaction rate on the anode surface, the more effective the additive is in improving cell performance. However, the competing reaction rates between the carbonate additive and the other electrolyte components are controlled not only by relative thermodynamics, but also by reaction kinetics. In other words, although all the prior art carbonate additives contain the same carbonate functional group (thermodynamic controlled), their decomposition reactivity is largely dependent on their molecular structure (kinetic controlled).

In order to form $Li_2CO_3$, the C—O bonds on both sides of carbonate compound must be broken. The reaction mechanism for carbonate reduction is proposed in the below two equations using dibenzyl carbonate as an example.

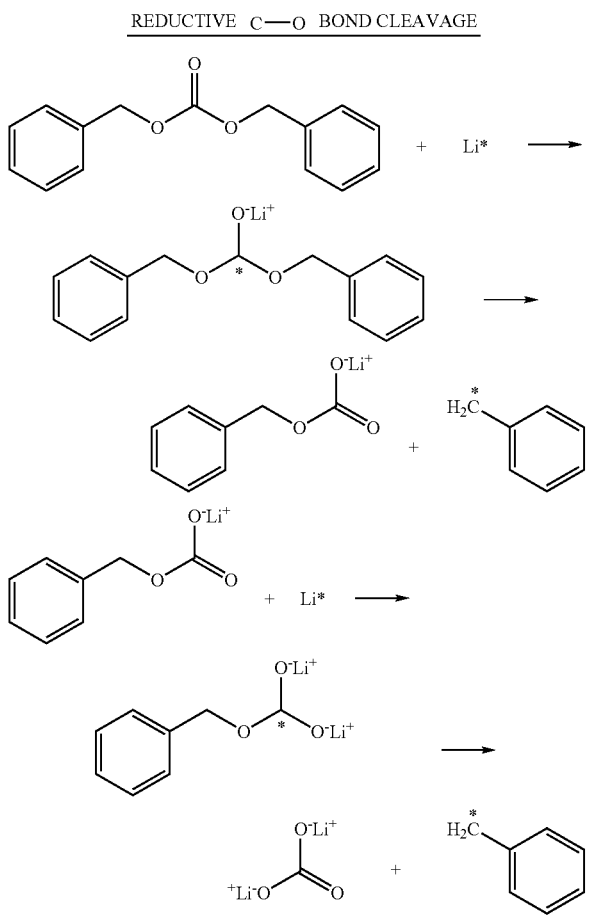

REDUCTIVE C—O BOND CLEAVAGE

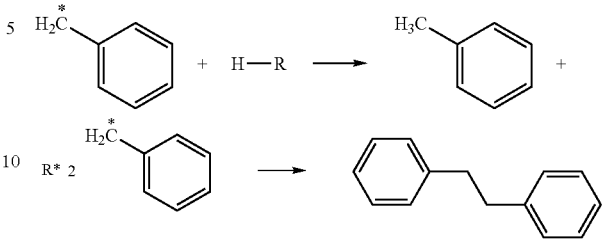

BENZYL RADICAL TERMINATION

In this mechanism, the first step is the reduction of one of the electrons to form an anion radical intermediate. This step is primarily thermodynamically controlled. The second step involves cleavage of the C—O bond to form the alkly lithium carbonate product, which undergoes further reduction with cleavage of the second C—O bond to form lithium carbonate as the final product. The second step is, however, controlled by kinetics. If the second step is fast enough, the carbonate additive effectively competes with the other electrolyte components to form the desired passivation layer on the anode surface. If, however, the second step is relatively slow, the carbonate additive is unable to compete with the other electrolyte components. As a result, the carbonate additive is ineffective in improving lithium cell performance.

In organic chemistry it is known that the process of bond cleavage can be facilitated by molecular orbital interactions. Orbital interactions become strong only when certain molecular confirmations are present. The stronger the orbital interaction, the faster bond cleavage. For the dibenzyl carbonate anion radical intermediate of the Gan et al. patent, alignment of the ρ-orbital carbonyl carbon ($sp^2$ hybridized), the σ-orbital of the C—O bond ($sp^3$ hybridized) and the ρ-orbital of the phenyl carbon ($sp^2$ hybridized) is believed to be critical for fast C—O bond cleavage kinetics. The three-dimensional structure and the Newman structure of the dibenzyl carbonate molecule in this conformation are shown below.

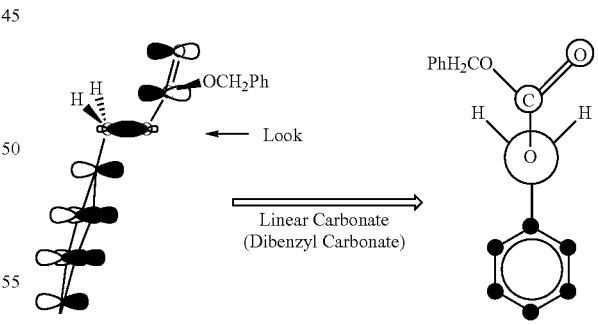

Linear Carbonate
(Dibenzyl Carbonate)

The flexibility of this linear carbonate makes it possible for the molecule to adopt the right conformation for easy bond cleavage. In that manner, the existence of orbital interaction lowers the activation energy for C—O bond cleavage in the anion radical intermediate.

The same principles governing C—O bond cleavage in linear carbonates also apply to cyclic carbonates. The molecular model of a phenyl substituted cyclic carbonate is shown below.

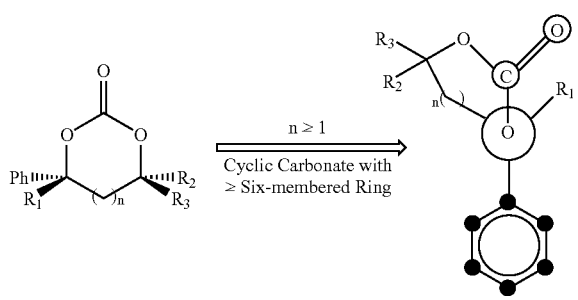

When n≧1 (six or larger member rings) the cyclic carbonate molecule adopts the conformation that allows for orbital overlap similar to that of dibenzyl carbonate.

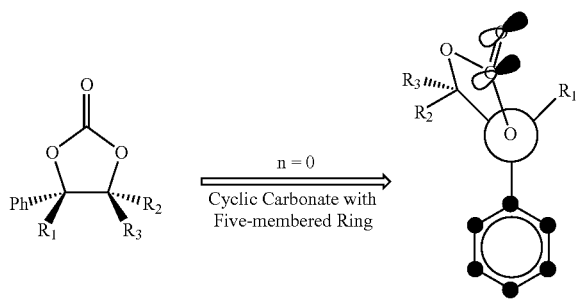

In contrast, when n=0 (five member ring), orbital overlap is not achieved due to ring strain. Although the ρ-orbital on the phenyl carbon is aligned with the σ-orbital of the C—O bond, the ρ-orbital of the carbonyl carbon cannot overlap with the σ-orbital of the C—O bond without breaking other bonds within the five-member ring.

The conclusion is that the five-member ring analog, such as 4-phenyl-1,3-diosolan-2-one and 4,5-diphenyl- 1,3-dioxolan-2-one, are not as effective as linear carbonates, such as dibenzyl carbonate, at making the SEI ionically conductive. Furthermore, larger cyclic carbonates, such as 4,6-diphenyl-1,3-dioxan-2-one result in a more ionically conductive SEI than do five-member ring carbonates, such as those of the Crespi et al. patent.

Therefore, according to the present invention, cyclic carbonates having ring sizes equal to or larger than a six-member ring are good electrolyte additives in the lithium electrochemical cells for beneficially modifying the SEI to eliminate voltage delay during pulse discharge and to reduce Rdc.

These and other objects of the present invention will become increasingly more apparent to those skilled in the art by reference to the following description.

DETAILED DESCRIPTION OF THE PREFERRED EMBODIMENTS

As used herein, the term "pulse" means a short burst of electrical current of significantly greater amplitude than that of a prepulse current immediately prior to the pulse. A pulse train consists of at least two pulses of electrical current delivered in relatively short succession with or without open circuit rest between the pulses. An exemplary pulse train may consist of four 10-second pulses (23.2 mA/cm$^2$) with a 15 second rest between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10 second pulse is suitable for medical implantable applications. However, it could be significantly shorter or longer depending on the specific cell design and chemistry.

The electrochemical cell of the present invention is particularly suited for powering an implantable medical device such as a cardiac defibrillator, and the like. The cell comprises an anode of a metal selected from Groups IA, IIA and IIIB of the Periodic Table of the Elements, including lithium, sodium, potassium, etc., and their alloys and inter-metallic compounds including, for example, Li—Si, Li—Al, Li—B and Li—Si—B alloys and inter-metallic compounds. The preferred anode comprises lithium. An alternate anode comprises a lithium alloy, such as lithium-aluminum alloy. The greater the amounts of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector contacted by a weld to a cell case of conductive material in a case-negative electrical configuration. Alternatively, the anode may be formed in some other geometry, such as a bobbin shape, cylinder or pellet to allow an alternate low surface cell design.

The electrochemical reaction at the cathode involves conversion of ions that migrate from the anode to the cathode into atomic or molecular forms. The cathode material comprises at least a first transition metal chalcogenide constituent, which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

Preferred cathode composites are prepared by mixing a decomposable metal salt, suitably the nitrate, of a metal with vanadium pentoxide. The mixture is thereafter ignited. The metal is most preferably selected from the group consisting of silver, copper, manganese and mixtures thereof. The resultant composite cathode includes $V_2O_x$ wherein $x≦5$ combined with one or more of $Ag_2O$ wherein x=0 to 1; $CuO_x$ wherein x=0 to 1; and $MnO_x$ wherein x=1 to 3. Thus, the composite cathode material may be described as a metal oxide-metal oxide, a metal-metal oxide, or a metal-metal oxide-metal oxide.

By way of illustration, and in no way intended to be limiting, an exemplary transition metal oxide cathode active material comprises silver vanadium oxide having the general formula $Ag_xV_2O_y$ in any one of its many phases, i.e. β-phase silver vanadium oxide having in the general formula x=0.35 and y=5.18, γ-phase silver vanadium oxide having in the general formula x=0.74 and y=5.37 and ε-phase silver vanadium oxide having in the general formula x=1.0 and y=5.5, and combination and mixtures of phases thereof. For a more detailed description of silver vanadium oxide cathode materials, reference is made to U.S. Pat. Nos. 4,310,609 to Liang et al., 5,389,472 to Takeuchi et al., 5,498,494 to Takeuchi et al. and 5,695,892 to Leising et al., all which are assigned to the assignee of the present invention and incorporated herein by reference.

Another preferred transition metal oxide is a composite cathode active material that includes $V_2O_z$ wherein $z \leq 5$ combined with $Ag_2O$ with the silver in either the silver(II), silver(I) or silver(0) oxidation state and CuO with the copper in either the copper(II), copper(I) or copper(0) oxidation state to provide the mixed metal oxide having the general formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq x \leq 1.0$, about $0.01 \leq y \leq 1.0$ and about $5.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material, reference is made to U.S. Pat. Nos. 5,472,810 and 5,516,340, both to Takeuchi et al., and both assigned to the assignee of the present invention and incorporated herein by reference.

Additional cathode active materials include manganese dioxide, cobalt oxide, nickel oxide, copper vanadium oxide, titanium disulfide, copper oxide, copper sulfide, iron sulfide and iron disulfide, and mixtures thereof.

In secondary cells, the positive electrode preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, lithium metal comprising the positive electrode is intercalated into a carbonaceous negative electrode or anode by applying an externally generated electrical potential to recharge the cell. The applied recharging electrical potential serves to draw the alkali metal from the cathode material, through the electrolyte and into the carbonaceous anode to saturate the carbon comprising the anode. The cell is then provided with an electrical potential and is discharged in a normal manner.

An alternate secondary cell construction comprises intercalating the carbonaceous material with the active alkali material before the negative electrode is incorporated into the cell. In this case, the positive electrode body can be solid and comprise, but not be limited to, such materials as manganese dioxide, silver vanadium oxide, titanium disulfide, copper oxide, copper sulfide, iron sulfide, iron disulfide and fluorinated carbon. However, this approach is comprised by problems associated with handling lithiated carbon outside the cell. Lithiated carbon tends to react when contacted by air or water.

The above-described active materials are formed into an electrode for incorporation into an electrochemical cell by mixing one or more of them with a conductive additive such as acetylene black, carbon black and/or graphite. Metallic materials such as nickel, aluminum, titanium and stainless steel in powder form are also useful as conductive diluents.

The electrode further comprises a binder material that is preferably a fluoro-resin powder such as powdered polytetrafluroethylene (PTFE) or powdered polyvinylidene fluoride (PVDF). More specifically, a preferred cathode active material comprises SVO in any one of its many phases, or mixtures thereof, and/or CSVO mixed with a binder material and a conductive diluent.

A preferred cathode active admixture comprises from about 80% to 99%, by weight, of a cathode active material comprising either one or both of the SVO and CSVO materials mixed with a suitable binder and a conductor diluent. The resulting blended cathode active mixture may be formed into a freestanding sheet prior to being contacted with a current collector to form the cathode electrode. Suitable current collectors are selected from the group consisting of stainless steel, titanium, tantalum, platinum and gold, titanium being preferred. The manner in which the cathode active mixture is prepared into a freestanding sheet is thoroughly described in U.S. Pat. No. 5,435,874 to Takeuchi et al. This patent is assigned to the assignee of the present invention and incorporated herein by reference. Further, rolling, spreading or pressing the cathode active mixture onto a suitable current collector may also be used to prepare cathode components. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.) and a polyethylene membrane commercially available from Tonen Chemical Corp. The separator may also be composed of non-woven glass, glass fiber materials and ceramic materials.

The form of the separator typically is a sheet that is placed between the anode and cathode electrodes and in a manner preventing physical contact there between. Such is the case when the anode is folded in a serpentine-like structure with a plurality of cathode plates disposed between the anode folds and received in a cell casing or when the electrode combination is rolled or otherwise formed into a cylindrical "jellyroll" configuration.

The electrochemical cell of the present invention further includes a nonaqueous, ionically conductive electrolyte. The electrolyte serves as a medium for migration of ions between the anode and the cathode during the electrochemical reactions of the cell, and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent and, more preferably, a lithium salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Low viscosity solvents include tetrahydrofuran (THF), diisopropylether, methyl acetate (MA), diglyme, triglyme, tetraglyme, 1,2-dimethoxyethane (DME), 1,2-diethoxyethane (DEE), 1-ethoxy,2-methoxyethane (EME), dimethyl carbonate (DMC), diethyl carbonate (DEC), dipropyl carbonate (DPC), ethyl methyl carbonate (EMC), methyl propyl carbonate (MPC), ethyl propyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-valerolactone, γ-butyrolactone (GBL), N-methyl-pyrrolidone (NMP), and mixtures thereof.

The preferred electrolyte comprises an inorganic alkali metal salt. In the case of an anode comprising lithium, the alkali metal salt is a lithium based salt. These include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiNO_3$, $LiB(C_6H_5)_4$, $LiCF_3SO_3$, and mixtures thereof. Suitable salt concentrations typically range between about 0.8 to 1.5 molar. A preferred electrolyte for a lithium/transition metal oxide electrochemical cell includes $LiAsF_6$ or $LiPF_6$ dissolved in a 50:50 mixture, by volume, of PC and DME.

In the present invention, the addition to the electrolyte solution of a cyclic carbonate having ring sizes equal to or larger than a six-members has beneficial effects in minimizing or eliminating voltage delay and reducing Rdc build-up when the cell is subjected to current pulse discharge conditions. The general structure of the cyclic carbonate is shown below.

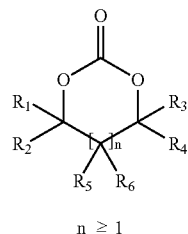

$n \geq 1$

In the cyclic carbonates of the present invention, n is equal to or greater than 1, and $R_1$, $R_2$, $R_3$, $R_4$, $R_5$, $R_6$ may be the same or different, each representing a hydrogen atom, an alkyl group having 1 to 12 carbon atoms (preferably 1 to 6 carbon atoms), an alkenyl group having 2 to 12 carbon atoms (preferably 2 to 6 carbon atoms), an alkynyl group with 2 to 12 carbon atoms (preferably 2 to 6 carbon atoms), an aryl group with 6 to 12 carbon atoms, an aralkyl group with 7 to 13 carbon atoms, a nitro group, a cyano group, and wherein at least one of the $R_1$, $R_2$, $R_3$, $R_4$ groups contains an $sp^2$ or sp hybridized carbon or nitrogen atom connected directly to the ring carbon atom.

Exemplary schematics of cyclic carbonates according to the present invention are shown below.

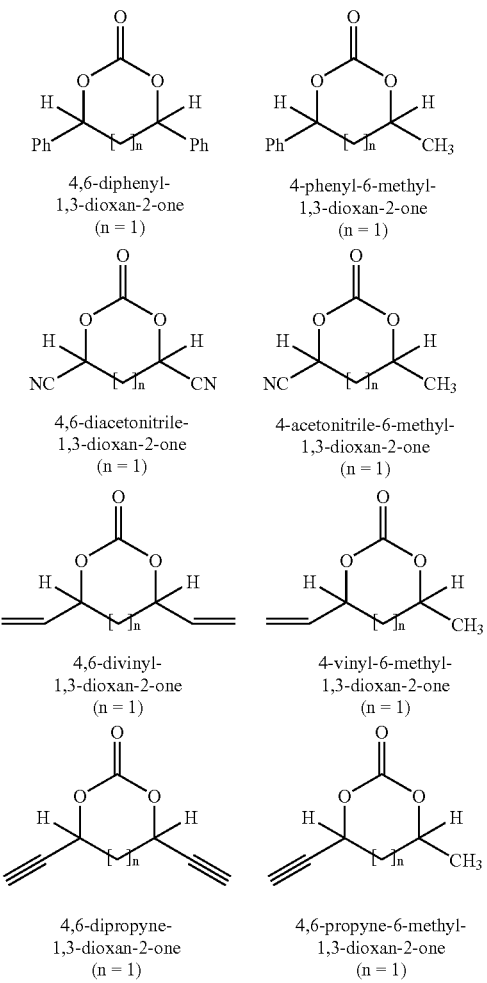

The preferred primary electrochemical cell has an anode of lithium metal and a cathode of ε-phase silver vanadium oxide ($AgV_2O_{5.5}$). The activating electrolyte is 1.0M to 1.4M $LiAsF_6$ or $LiPF_6$ dissolved in a 50/50 aprotic solvent mixture by volume, of propylene carbonate and 1,2-dimethoxyethane. The preferred secondary cell has graphite as the anode material, $LiCoO_2$ as the cathode active material and an activating electrolyte of ethylene carbonate and an equilibrated molar mixture of dimethyl carbonate, ethyl methyl carbonate and diethyl carbonate. For a more detailed description of an electrolyte for a secondary cell, reference is made to U.S. Pat No. 6,746,804 to Gen et al. This patent is assigned to the assignee of the present invention and incorporated herein by reference. In either cell chemistry, the cyclic carbonate additive is present in a concentration range of between about 0.001M to about 0.1M.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cathode lead is welded to the positive terminal pin in the glass-to-metal seal and the header is welded to the case containing the electrode stack. The casing is thereafter filled with the electrolyte solution comprising at least one of the above described cyclic carbonates and hermetically sealed such as by close-welding a stainless steel ball over the fill hole, but not limited thereto.

The above assembly describes a case-negative cell, which is its preferred construction. As is well known to those skilled in the art, however, the exemplary electrochemical system of the present invention can also be constructed in a case-positive configuration.

It is appreciated that various modifications to the present inventive concepts described herein may be apparent to those of ordinary skill in the art without disporting from the spirit and scope of the present invention as defined by the herein appended claims.

What is claimed is:

1. An electrochemical cell comprising an alkali metal anode; a cathode; and an electrolyte operatively associated with the anode and the cathode, the improvement in the cell comprising:
   a) a cyclic carbonate additive dissolved in the electrolyte and having the formula:

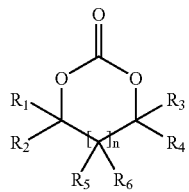

b) wherein at least one of the $R_1$, $R_2$, $R_3$, $R_4$ groups contains an $sp^2$ or $sp$ hybridized carbon or nitrogen atom connected directly to the ring carbon atom.

2. The electrochemical cell of claim 1 wherein $n \geq 1$.

3. The electrochemical cell of claim 1 wherein $R_1$, $R_2$, $R_3$, $R_4$, $R_5$, $R_6$ are the same or different and they are selected from the group consisting of a hydrogen atom, an alkyl group of 1 to 12 carbon atoms, an alkenyl group of 2 to 13 carbon atoms, an alkynyl group of 2 to 12 carbon atoms, an aryl group of 6 to 12 carbon atoms, an aralkyl group of 7 to 13 carbon atoms, a nitro group, and a cyano group provided that not all of them are a hydrogen atom.

4. The electrochemical cell of claim 1 wherein the cyclic carbonate additive is selected from the group consisting of 4,6-diphenyl-1,3-dioxan-2-one, 4-phenyl-6-methyl-1,3-dioxan-2-one, 4,6-diacetonitrile-1,3-dioxan-2-one, 4-acetonitrile-6-methyl-1,3-dioxan-2-one, 4,6-vinyl-1,3-dioxan-2-one, 4-vinyl-6-methyl-1,3-dioxan-2-one, 4,6-dipropyne-1,3-dioxan-2-one, 4-propyne-6-methyl-1,3-dioxan-2-one, and mixtures thereof.

5. The electrochemical cell of claim 1 wherein the cyclic carbonate additive is present in the electrolyte in a range of about 0.001M to about 0.20M.

6. The electrochemical cell of claim 1 wherein the cathode active oxide is selected from the group consisting of silver vanadium oxide, copper silver vanadium oxide, manganese dioxide, cobalt oxide, nickel oxide, copper vanadium oxide, titanium disulfide, copper oxide, copper sulfide, iron sulfide, iron disulfide, $LiNiO_2$, $LiMn_2O_4$, $LiCoO_2$, $LiCo_{0.92}Sn_{0.08}O_2$, $LiCo_{1-x}Ni_xO_2$, and mixtures thereof.

7. The electrochemical cell of claim 1 wherein the electrolyte comprises a solvent selected from the group consisting of tetrahydrofuran, diisopropylether, methyl acetate, diglyme, triglyme, tetraglyme, 1,2-dimethoxyethane, 1,2-diethoxyethane, 1-ethoxy,2-methoxyethane, dimethyl carbonate, diethyl carbonate, dipropyl carbonate, ethyl methyl carbonate, methyl propyl carbonate, ethyl propyl carbonate, propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidone, and mixtures thereof.

8. The electrochemical cell of claim 1 wherein the electrolyte includes a salt selected from the group consisting of $LiPF_6$, $LiBF_4$, $LiAsF_6$, $LiSbF_6$, $LiClO4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiNO_3$, $LiB(C_5H_5)_4$, $LiCF_3SO_3$, and mixtures thereof.

9. The electrochemical cell of claim 1 of a primary chemistry comprising a lithium anode, a silver vanadium oxide cathode and an electrolyte of 1.0M to 1.4M $LiAsF_6$ or $LiPF_6$ dissolved in propylene carbonate and 1,2-dimethoxyethane.

10. The electrochemical cell of claim 1 of a secondary chemistry having graphite as an anode material, $LiCoO_2$ as a cathode active material and an activating electrolyte of ethylene carbonate, dimethyl carbonate, ethyl methyl carbonate and diethyl carbonate.

11. An electrochemical cell, which comprises:
    a) a lithium anode;
    b) a cathode of silver vanadium oxide; and
    c) an activating electrolyte comprising a cyclic carbonate having the formula:

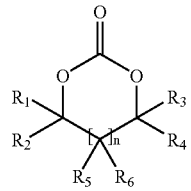

d) wherein at least one of the $R_1$, $R_2$, $R_3$, $R_4$ groups contains an $sp^2$ or $sp$ hybridized carbon or nitrogen atom connected directly to the ring carbon atom.

12. The electrochemical cell of claim 11 wherein $n \geq 1$.

13. The electrochemical cell of claim 11 wherein $R_1$, $R_2$, $R_3$, $R_4$, $R_5$, $R_6$ are the same or different and they are selected from the group consisting of a hydrogen atom, an alkyl group of 1 to 12 carbon atoms, an alkenyl group of 2 to 13 carbon atoms, an alkynyl group of 2 to 12 carbon atoms, an aryl group of 6 to 12 carbon atoms, an aralkyl group of 7 to 13 carbon atoms, a nitro group, and a cyano group provided that not all of them are a hydrogen atom.

14. A method for providing an electrochemical cell, comprising the steps of:

a) providing a casing;
b) housing an anode of lithium inside the casing;
c) providing a cathode of a cathode active material inside the casing; and
d) activating the anode and the cathode with an electrolyte having a cyclic carbonate dissolved therein, the cyclic carbonate having the formula:

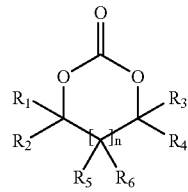

e) wherein at least one of the $R_1$, $R_2$, $R_3$, $R_4$ groups contains an $sp^2$ or sp hybridized carbon or nitrogen atom connected directly to the ring carbon atom.

15. The method of claim 14 wherein $n \geqq 1$.

16. The method of claim 14 wherein $R_1$, $R_2$, $R_3$, $R_4$, $R_5$, $R_6$ are the same or different and they are selected from the group consisting of a hydrogen atom, an alkyl group of 1 to 12 carbon atoms, an alkenyl group of 2 to 13 carbon atoms, an alkynyl group of 2 to 12 carbon atoms, an aryl group of 6 to 12 carbon atoms, an aralkyl group of 7 to 13 carbon atoms, a nitro group, and a cyano group provided that not all of them are a hydrogen atom.

17. The method of claim 14 including selecting the cyclic carbonate from the group consisting of 4,6-diphenyl-1,3-dioxan-2-one, 4-phenyl-6-methyl-1,3-dioxan-2-one, 4,6-diacetonitrile-1,3-dioxan-2-one, 4-acetonitrile-6-methyl-1,3-dioxan-2-one, 4,6-divinyl-1,3-dioxan-2-one, 4-vinyl-6-methyl-1,3-dioxan-2-one, 4,6-dipropyne-1,3-dioxan-2-one, 4-propyne-6-methyl-1,3-dioxan-2-one, and mixtures thereof.

* * * * *

UNITED STATES PATENT AND TRADEMARK OFFICE
CERTIFICATE OF CORRECTION

PATENT NO. : 7,033,707 B2 Page 1 of 1
APPLICATION NO. : 10/368658
DATED : April 25, 2006
INVENTOR(S) : Gan et al.

It is certified that error appears in the above-identified patent and that said Letters Patent is hereby corrected as shown below:

<u>Column 10,</u>
Line 53, delete "Gen" and insert -- Gan --.

Signed and Sealed this

Twenty-seventh Day of June, 2006

JON W. DUDAS
*Director of the United States Patent and Trademark Office*